United States Patent Office 3,541,784
Patented Nov. 24, 1970

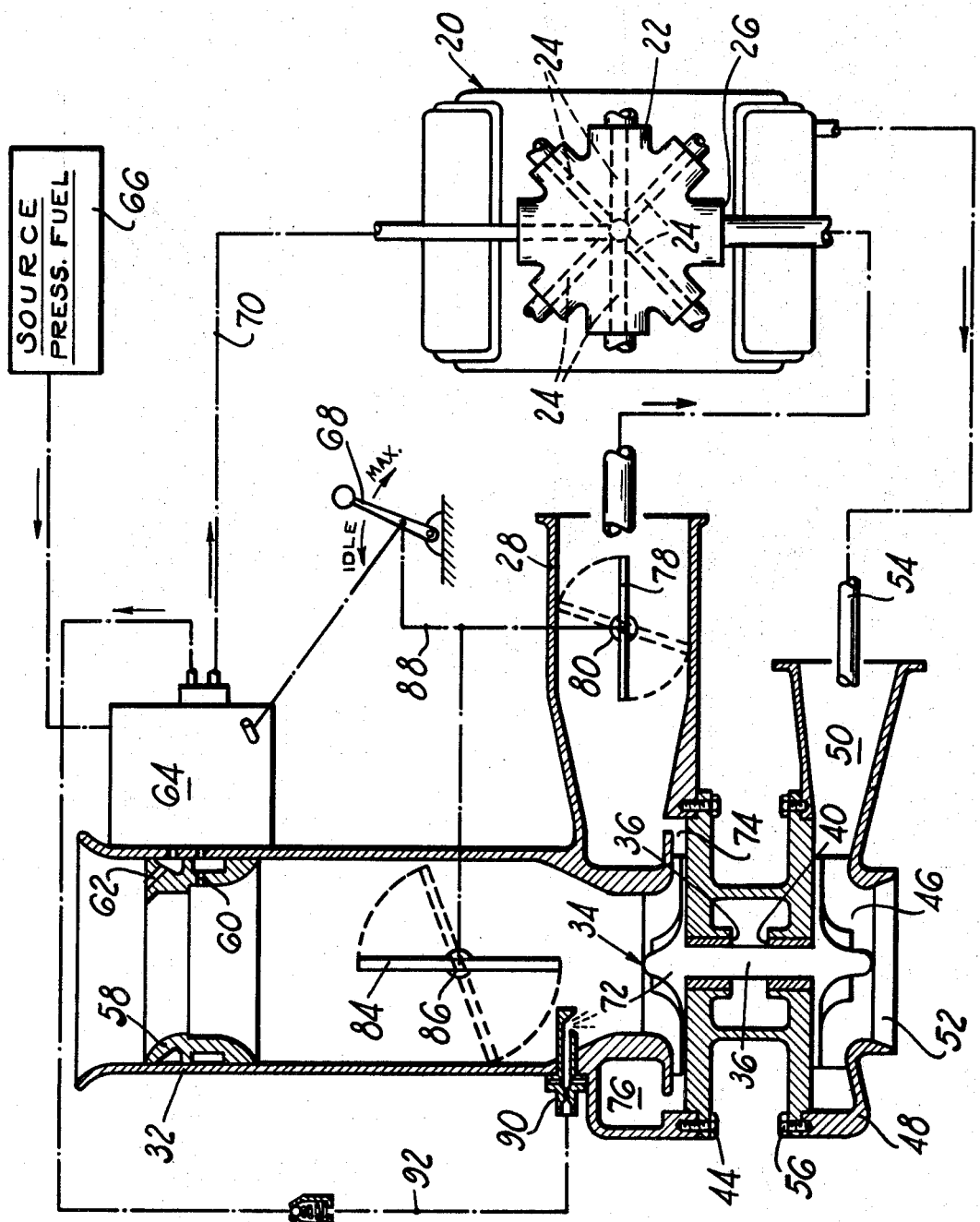

3,541,784
CONTROL SYSTEM FOR TURBO CHARGED INTERNAL COMBUSTION ENGINE
Elmer A. Haase, South Bend, Ind., assignor to The Bendix Corporation, a corporation of Delaware
Filed June 24, 1968, Ser. No. 739,565
Int. Cl. F02b 37/08
U.S. Cl. 60—13
9 Claims

ABSTRACT OF THE DISCLOSURE

Air induction apparatus for an internal combustion engine of the fuel injected type wherein an air induction conduit has an engine exhaust driven air compressor mounted therein for pressurizing air flow to the engine cylinders. The air induction conduit is provided with manually actuated simultaneously movable air throttle valves upstream and downstream of the compressor and in close proximity thereto which close during an engine deceleration to isolate the compressor from air disturbances in the air conduit upstream and downstream therefrom. During an engine deceleration, the closed downstream throttle valve prevents formation of a vacuum at the compressor outlet thereby resulting in faster air pressure recovery when the downstream throttle valve is opened for engine acceleration as well as minimizing compressor bearing oil leakage into the engine air induction conduit.

---

Engine exhaust driven air superchargers or turbochargers for pressurizing the air flow to the cylinders of a fuel injected internal combustion engine have been used over the past years on engine installations wherein engine operation, for the most part, is relatively stable at a selected engine speed or power output as, for example, in aircraft use. Such turbo-charged systems while adequate for use with engines adapted to operate under such expected relatively stable operation do not perform satisfactorily when used with internal combustion engines where rapid accelerations of the engine are required as, for example, in high performance engines used in vehicles adapted for competion racing. Various problems in the air induction system are encountered as a result of rapid acceleration and deceleration demands on the engine which problems include air surges through the air induction conduit including the air compressor caused by sudden closing or opening of the air throttle valve. The sudden closing of the air throttle valve may result in reverse air flow and/or air pressure fluctuations across the air compressor which produces compressor surge thereby reducing compressor efficiency and thus air pressure recovery downstream from the compressor when the air throttle valve is suddenly opened for a subsequent engine acceleration. Other problems arise as a result of exposing the compressor to a vacuum when an air throttle valve upstream therefrom is closed to decelerate the engine which vacuum may cause oil leakage through the compressor bearings into the air induction system and subsequent engine spark plug fouling. Also, air surges in either direction through the compressor result in a power drain on the compressor driving turbine as well as rotating masses connected thereto which, in turn, causes an undesirable reduction in compressor operating r.p.m. during an enigne deceleration which must be recovered as rapidly as possible under a subsequent engine acceleration.

It is an object of the present invention to provide a fuel injected internal combustion engine air supercharger particularly adapted for use on an engine exposed to frequent and/or rapid accelerations and decelerations.

It is another object of the present invention to provide an internal combustion engine air induction system embodying an air compressor and air throttle valves disposed upstream and downstream from the compressor and in series flow therewith.

It is a further object of the present invention to provide a high performance combustion enigne of the turbo-charged type with air flow throttle valves upstream and downstream from an in relatively close proximity to an air compressor to substantially isolate the compressor from induction air flow disturbances resulting from a sudden deceleration of the engine.

Other objects and advantages will be apparent from the following description taken with the accompanying drawing representing a schematic showing of a fuel injected internal combustion engine and a supercharged air induction system therefor embodying the present invention.

Referring to the drawing, numeral 20 designates a conventional multiple cylinder internal combustion engine having an air manifold 22 connected to supply air to the engine cylinders. The air manifold 22 may take various forms but in the preferred embodiment shown, a plurality of fuel injection nozzles 24 are contained by the manifold 22 with each fuel injection nozzle arranged to inject fuel into the air passing to a corresponding one of the engine cylinders. Reference is made to U.S. application Ser. No. 654,658, filed July 19, 1967, in the name of E. A. Haase (common assignee), entitled "Fuel Supply System for Combustion Engines" which describes in detail the abovementioned air manifold 22 and associated fuel injection nozzle arrangement.

The air manifold 22 is provided with an inlet 26 connected to receive pressurized air from an air outlet passage 28 in a casing 30. The casing 30 is suitably fixed in position relative to the engine by conventional support means, not shown, and defines an air inlet conduit 32 which receives air at atmospheric air pressure $P_a$ and conducts the air flow to the inlet of a centrifugal air compressor 34. The air compressor 34 is fixedly secured to a shaft 36 which, in turn, is mounted for rotation in bearings 38 and 40 carried by a support member 42 fixedly secured to casing 30 by any suitable conventional fastening means such as bolts 44. The air compressor 34 is driven by a gas turbine 46 fixedly secured to the end of shaft 36 and enclosed by a casing 48 provided with a gas inlet 50 and gas outlet 52. The gas inlet 50 is connected to receive hot motive exhaust gases discharged from the cylinders of the engine 20 via conduit 54. The hot motive exhaust gas impinges the blades of the gas turbine 46 to impart rotational power to the compressor 34. The gas exhausted by turbine 46 passes through outlet 52 to the atmosphere. The casing 48 is fixedly secured to support member 42 by any suitable fastening means such as bolts 56.

The mass air flow passing through air inlet conduit 32 is sensed by a venturi 58 suitably mounted in position within conduit 32 and provided with passages 60 and 62 connected to transmit venturi static throat air pressure and venturi ram air pressure, respectively, to a fuel control generally indicated by 64. The fuel control 64, per se, may take various conventional forms but is preferably of the type disclosed in Pat. No. 3,114,359, issued Dec. 17, 1963, in the name of E. A. Haase (common assignee) or in the heretofore mentioned patent application Ser. No. 654,658 which fuel controls meter fuel flow to the engine as a function of the mass air flow to the engine. Reference is made to said Pat. No. 3,114,359 or patent application Ser. No. 654,658 for specific details of structure and operation of the fuel control 64. For the purpose of explaining the present invention, it is not believed necessary to elaborate on the fuel control 64 beyond pointing out that it is connected to receive fuel from a pressurized source generally indicated by 66 and is provided with controllable fuel metering means, not shown, actuated as a function of selected variable operational conditions which may include mass air flow to the engine as represented by the air pressure differential derived from venturi 58, speed or power control lever position established by a control lever 68 and/or additional variable conditions as will be recognized by those persons skilled in the art. The flow of metered pressurized fuel is transmitted via a fuel conduit 70 from fuel control 64 to the plurality of fuel injection nozzles 24 which inject the metered fuel into the air flow to the associated engine cylinders.

The air compressor 34 is of the centrifugal type and conventional in that it includes an impeller 72 connected to receive the air flow taken in by conduit 32 and discharge the same radially outwardly to an annulus 74 which, in turn, discharges to an annular diffuser section 76 defined by casing 30 from which the pressurized air passes to outlet passage 28 and then to air manifold inlet 26.

The mass air flow through conduit 32 to the engine 20 varies as a function of the effective flow area of conduit 32 and is controlled by an air throttle valve 78 suitably mounted for pivotal movement between opened and closed positions to a shaft 80 which, in turn, is rotatably secured to the wall of outlet passage 28. The control lever 68 is connected via link 82 to shaft 80 which, as well as throttle valve 78 attached thereto, is actuated in accordance with the position of control lever 68. The air throttle valve 78 is located as close to the impeller 72 as practical with regard to the relative diameters of the air throttle valve 78 and outlet passage 28 to reduce the volume of pressurized air between the impeller 72 and the throttle valve 78 to a minimum without sacrificing complete control by throttle valve 78 over the effective flow area of outlet passage 28.

A second air throttle valve 84 upstream from impeller 72 is mounted for pivotal movement in conduit 32 to a shaft 86 rotatably secured to the wall of conduit 32. The control lever 68 is connected via a link 88 to shaft 86 such that the throttle valve 84 moves in unison with throttle valve 78 in accordance with the position of control lever 68. It will be understood that, for any given position of control lever 68, the throttle valve 84 establishes an effective flow area of inlet conduit 32 which is substantially greater than the effective flow area of outlet passage 28 established by throttle valve 78. The relative positions of throttle valves 78 and 84 and thus relative flow areas established thereby for any given position of control lever is such that the air pressure drop across the upstream throttle valve 84 never exceeds a predetermined relatively low value as, for example, 1" Hg. The throttle valve 84 may be considered ineffective for air flow control purposes except when closed during an engine deceleration as will be described hereinafter.

A fuel injection nozzle 90 may be mounted to casing 30 so as to inject a predetermined percentage of fuel metered by fuel control 64 into the air flow entering impeller 72 to improve the efficiency of the compressor 34 as well as reduce the discharge air temperature of compressor 34 which, in turn, improves the detonation limit of the air-fuel mixture fed to the cylinders of engine 20. The fuel injection nozzle 90 is preferably of the well-known air bleed type similar to that shown in U.S. Pat. No. 3,140,324, issued July 7, 1964, in the name of E. A. Haase (common assignee). The fuel injection nozzle 90 is connected via passage 92 to the fuel control 64 to receive the desired percentage of fuel metered by fuel control 64 which percentage may be varied to compensate for the fuel type used thereby optimizing engine power output. A spring loaded check valve 94 in passage 92 may be provided to prevent fuel flow to nozzle 90 until a predetermined metered fuel pressure and thus engine power output is attained thereby preventing pressurization of nozzle 90 under engine idle conditions.

Assuming the engine 20 to be operating at maximum speed corresponding to the maximum power setting of control lever 68, the air throttle valves 78 and 84 will occupy corresponding wide open positions as indicated by the solid line outlines thereof in the drawing. Air passes through venturi 58 providing the desired mass air flow pressure signal to fuel control 64 which, in turn, meters fuel as a function of the mass air flow. The percentage of the total metered fuel passing to injection nozzle 90 is injected into the air flow intermediate throttle valve 84 and impeller 72. The resulting air-fuel mixture undergoes a temperature drop as a result of the heat absorbed in vaporizing the fuel thereby causing a corresponding reduction in temperature rise across the compressor 34 and thus air temperature at the outlet of impeller 72. The pressurized air-fuel mixture passes to air manifold 22 which distributes the same to the various engine cylinders and wherein each of the fuel injection nozzles 24 which receive the remaining major portion of the fuel metered by fuel control 64 inject fuel to the air distributed to its associated cylinder.

Now, assuming a request for a rapid deceleration, the control lever 68 is actuated to the idle position causing the throttle valves 78 and 84 to move to corresponding closed positions as indicated in dashed outline in the drawing whereby a minimum effective flow area of outlet passage 28 corresponding to the idle air flow requirements of the engine is established. The throttle valve 78 being downstream from impeller 72 restricts air flow to the extent that a relatively high compressor back air pressure is maintained in annulus 76. In this manner, the vacuum downstream from throttle valve 78 is isolated from the compressor 34 thereby minimizing the possibility of oil leakage across bearing 38 and eliminating spark plug fouling.

Further, during a subsequent request for a rapid acceleration caused by actuation of throttle valve 78 to a fully open position, the magnitude of compressor surge resulting from expansion of the relatively high pressure air upstream from throttle valve 78 is reduced to a low level.

Upon closing, the throttle valve 84 together with throttle valve 78 checks air flow in either direction through impeller 72 to the extent that undesirable high rates of reverse or circulating air flow through the compressor 34 cannot occur during an engine deceleration which reverse or circulating air flow tends to produce undesirable compressor surge. As a result of the compressor 34 being substantially isolated in the chamber partially defined by closed throttle valves 78 and 84, the impeller 72 cannot produce any significantly great air flow in either direction and requires only windage power from turbine 46 and associated rotating masses. Thus, during an engine deceleration, the turbine 46 r.p.m. remains at a correspondingly higher level permitting faster operational r.p.m. of the turbine 46 upon subsequent engine accelerations It will be recognized by those persons skilled in the art that the fuel injection nozzle 90 may be adapted to inject all of the fuel metered by control 64 into the air flow upstream from compressor 34 in which case the fuel injection nozzles 24 may be eliminated. Also, the fuel control 62 may meter fuel on a basis other than the preferred mass air flow principle in which case the venturi 58 may not be required.

I claim:

1. Control apparatus for a multi-cylinder internal combustion engine comprising:

air induction conduit means for continuously supplying air to the cylinders of said engine;

air compressor means operatively connected to said conduit means for pressurizing said continuously supplied air flow therethrough;

a control lever for controlling the power output of the engine;

first valve means operatively connected to said control lever and said conduit means downstream from said air compressor means for controlling the effective flow area of said conduit means and thus said pressurized air flow to the cylinders of said engine as a function of the position of said control lever at all times over the operating range of said engine;

second valve means operatively connected to said control lever and said conduit means upstream from said air compressor means for controlling the flow area of said conduit means in response to the position of said control lever;

said first and second valve means being actuated to predetermined closed positions in response to movement of said control lever to a minimum power position to substantially isolate said air compressor means from said conduit means upstream and downstream therefrom thereby unloading said compressor;

said first and second valve means being located in said conduit means substantially immediately adjacent the outlet and inlet, respectively, of said air compressor means to minimize the volume of said conduit means intermediate said compressor means and said closed first and second valve means.

2. Control apparatus as claimed in claim 1 wherein:
said first and second valve means move in unison in response to movement of said control lever;
said first valve means being operative to provide the major restriction to air flow through said conduit means at all times over the operating range of the engine.

3. Control apparatus as claimed in claim 1 wherein:
said air compressor means is a centrifugal compressor driven by engine exhaust gas.

4. Control apparatus as claimed in claim 1 and further including:
fuel injection means operatively connected to said conduit means for injecting pressurized fuel into the air flow passing to the cylinders of said engine;
fuel metering means operatively connected to said fuel injection means for supplying metered pressurized fuel thereto.

5. Control apparatus as claimed in claim 4 wherein:
said fuel metering means includes mass air flow measuring means connected to said conduit means upstream from said compressor for providing a control signal representing mass air flow through said conduit means;
fuel control valve means for metering fuel flow to said fuel injection means; and
means responsive to said control signal and operatively connected to said fuel control valve means for actuating said fuel control valve means as a function of mass air flow through said conduit means.

6. Control apparatus as claimed in claim 4 wherein:
said fuel injection means includes a plurality of fuel injection nozzles operatively connected to said conduit means downstream from said first valve means.

7. Control apparatus as claimed in claim 4 wherein:
said fuel injection means includes a plurality of fuel injection nozzles operatively connected to said conduit means downstream from said first valve means; and
at least one additional fuel injection nozzle operatively connected to said fuel metering means and said conduit means upstream from said compressor for injecting a predetermined portion of said metered fuel into the air flow passing to said compressor at desired power.

8. Control apparatus as claimed in claim 2 wherein:
said first and second valve means are air flow throttle valves in series flow relationship;
said second air flow throttle valve providing substantially no restriction to air flow to said compressor downstream therefrom in that the effective air flow area thereof is significantly greater than that of said first air flow throttle valve for any given power position of said control lever in excess of said minimum power.

9. Control apparatus as claimed in claim 7 and further including:
valve means upstream from said one additional nozzle for preventing metered fuel flow thereto below a predetermined engine power condition.

References Cited
UNITED STATES PATENTS

| | | | |
|---|---|---|---|
| 1,816,737 | 7/1931 | Moss | 60—13 |
| 2,233,319 | 2/1941 | Lozivit | 123—119 |
| 2,295,656 | 9/1942 | Hersey | 123—119 |
| 2,336,844 | 12/1943 | Buck | 123—119 |
| 2,882,880 | 4/1959 | Reggio | 123—119 |
| 3,049,865 | 8/1962 | Drayer | 60—13 |
| 3,114,359 | 12/1963 | Haase | 123—139 |
| 3,208,213 | 9/1965 | Anderson | 60—13 |

DOUGLAS HART, Primary Examiner

U.S. Cl. X.R.
123—119; 415—149